US007949657B2

(12) United States Patent
Mityagin et al.

(10) Patent No.: US 7,949,657 B2
(45) Date of Patent: May 24, 2011

(54) DETECTING ZERO-RESULT SEARCH QUERIES

(75) Inventors: Anton Mityagin, Woodinville, WA (US); Kumar Hemachandra Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 11/953,889

(22) Filed: Dec. 11, 2007

(65) Prior Publication Data

US 2009/0150375 A1    Jun. 11, 2009

(51) Int. Cl.
G06F 7/00    (2006.01)
G06F 17/30    (2006.01)

(52) U.S. Cl. ........................................ 707/728; 707/771
(58) Field of Classification Search .......... 707/600–610, 707/728, 771
See application file for complete search history.

(56) References Cited

U.S. PATENT DOCUMENTS

| 5,745,890 A | 4/1998 | Burrows |
| 5,778,400 A | 7/1998 | Tateno |
| 6,016,493 A | 1/2000 | Burrows |
| 6,678,694 B1 | 1/2004 | Zimmermann et al. |
| 7,019,674 B2 | 3/2006 | Cadambi et al. |
| 2005/0108200 A1 | 5/2005 | Meik et al. |
| 2005/0197828 A1* | 9/2005 | McConnell et al. ............. 704/9 |
| 2006/0020571 A1 | 1/2006 | Patterson |
| 2006/0294086 A1 | 12/2006 | Rose et al. |
| 2006/0294311 A1 | 12/2006 | Fu et al. |
| 2009/0094208 A1* | 4/2009 | Marvit et al. ..................... 707/3 |
| 2010/0057800 A1* | 3/2010 | Hawking ...................... 707/728 |

OTHER PUBLICATIONS

Luo, "Efficient Detection of Empty-Result Queries", IBM T.J. Watson Research Center, 2006, VLDB Endowment, pp. 1-11.
Brial, "How Manutan International used search to increase customer sales and loyalty", 2007, CMP Media LLC, pp. 1-4.

* cited by examiner

*Primary Examiner* — Hosain T Alam
*Assistant Examiner* — Navneet K Ahluwalia
(74) *Attorney, Agent, or Firm* — Capitol City TechLaw; Richard C. Irving (57) ABSTRACT

A processing device and method may be provided for determining whether a zero search result may be produced with respect to a search for a document including all words of a word group. An index, with respect to words included in a group of documents, may be searched for documents including all words of the word group when a zero search result is determined not likely to occur with respect to the search for the document including all of the words of the word group. A method for creating multiple types of data structures corresponding to word grouping collections may further be provided to store occurrence information indicating a likelihood of a presence of a document including all words of a word group.

19 Claims, 6 Drawing Sheets

DETECTING ZERO-RESULT SEARCH QUERIES

BACKGROUND

A document may be a word processing file, a presentation file, a Portable Document Format (PDF) file, or other type of file. Typically, a search engine may query one or more indices to find documents which include one or more particular words. If at least one document is found, which includes the one or more particular words, the one or more indices may provide information with respect to the at least one document, as well as one or more locations at which the one or more particular words appear within the at least one document. Some search engines may maintain multiple indices with respect to words included in multiple documents such that, for example, a first index regarding popular documents may be stored in a first medium having a relatively short access time, while a second index regarding less popular documents may be stored in a second medium having a relatively longer access time.

Often, search engine queries produce no search results. However, a significant amount of processing resources may be consumed by searching one or more indices to process such queries.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device are provided for creating at least one data structure, including occurrence information, for determining whether a query for at least one document of a group of documents including a group of words is likely to produce a non-zero search result. A list of distinct words may be obtained by parsing the group of documents. A frequency of use of each of the distinct words may be determined and a rank may be assigned to each of the distinct words based on the determined frequency of use. A list of word groupings from the list of distinct words may be extracted. The word groupings may be distributed into a number of word grouping collections based on respective rankings assigned to each word of the word groupings. A respective density level of each of the word grouping collections may be determined and a corresponding category may be assigned to each of the word grouping collections based, at least in part, on the respective density level. Occurrence information, indicating a likelihood that words of word groupings are included in any one of the group of documents, may be stored in a data structure. A type of the data structure may be based on a category of a corresponding word grouping collection.

In some embodiments consistent with the subject matter of this disclosure, a method and a processing device may be provided for determining a likelihood of a presence of a group of words in any one of a group of documents. A group of words, which may be included in a query, may be received and converted to a ranking group corresponding to ranks of each word of the group of words. A word grouping collection and a corresponding category may be identified based on the ranking group. A likelihood of a presence of at least one document of the group of documents including all words of the group of words may be determined from occurrence information stored in a data structure corresponding to the identified word grouping collection. At least one index, with respect to the group of documents, may be searched in an attempt to find one of the group of documents which has all of the words of the group of words when the likelihood of the presence of the at least one document of the group of documents is indicated by the occurrence information.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for determining whether a group of words are likely to be included in at least one document of a group of documents before expending processing resources to search one or more search indices, associated with the group of documents, to determine which of the documents include the group of words.

In one embodiment, a list of distinct words may be produced from words included in the group of documents. A frequency of use of each of the distinct words within the group of documents may be determined. The list of distinct words may be sorted in descending order based on respective frequencies of use, such that more frequently used distinct words may appear earlier in the list of distinct words than less frequently used distinct words. Rankings may then be assigned to each of the distinct words based on respective positions of the distinct words within the sorted list of distinct words. A list of distinct word groups of a predetermined word length may be produced. In one embodiment the predetermined word length is two. In other embodiments, a different predetermined word length may be employed.

The distinct word groups may be converted to ranking groups, based on each word's rank. For example, if a group of two words have respective ranks 12 and 120, then a corresponding ranking group may be {12, 120}. The distinct word groups may be sorted in ascending order by a first ranking, and then by a second ranking. Thus, for example, for a word length of two, the sorted word groups may be sorted such that the corresponding rank groupings may be {1, 2}, {1, 3}, ... {2, 1}, {2, 3}, {n, n−1}.

A range of ranking groups corresponding to word groups having a word length of, for example, 2 (i.e., word pairs) may be divided into a number of word grouping collections. For example, the range of rank groupings corresponding to a group of words, each having a word length of, for example, two, may be divided into m×m word grouping collections. Thus, each of the m×m word grouping collections may have an associated range of ranking groups.

The sorted distinct word groups may then be distributed among the m×m word grouping collections, such that occurrence information corresponding to the distinct word groups may be stored in data structures to indicate a likelihood of a presence of respective distinct word groups among any one of the group of documents.

Each of the word grouping collections may be assigned a category based on a density of associated word groups likely to be present in at least one document of the group of documents. For example, when greater than a first percentage of possible word groups of a word grouping collection are indicated as likely being present in at least one document of the group of documents, as may be indicated by one or more search indices, the word grouping collection may be assigned a "high density level" category. When less than the first percentage, but more than a second percentage of possible word groups of a word grouping collection, are indicated as likely being present in at least one document of the group of documents, as indicated by the one or more search indices, the word grouping collection may be assigned a "medium density level" category. When less than the second percentage of possible word groups of a word grouping collection are indicated as likely being present in at least one document of the group of documents, as indicated by the one or more search indices, the word grouping collection may be assigned a "low density level" category. Although, the above describes three density levels, some embodiments consistent with the subject matter of this disclosure may have more or fewer density levels.

In some embodiments, a specific amount of memory may be allocated to store occurrence information indicating a likely presence of a word group in at least one document of the group of documents, in corresponding word grouping collections. The specific amount of memory may be allocated to word grouping collections having a "high density" or a "medium density" and to word grouping collections having a "low density", if the specific amount of memory has not been exceeded. If the specific amount of memory has been exceeded, the word grouping collections having the "low density" may be assigned a "not stored" category, indicating that occurrence information for ranking groups corresponding to the word grouping collections having the "low density" may not be stored. In other embodiments, query history information may be used to determine whether occurrence information with respect to particular word grouping collections may or may not be stored. For example, if the query history shows that word groups of particular word grouping collections are rarely, if ever, used in queries, then the particular word grouping collections may not be stored.

In various embodiments, occurrence information may be stored in different data structures based on a category assigned to a word grouping collection. For example, in one embodiment, occurrence information with respect to word groups of a word grouping collection assigned a "high density level" category may be stored in a bit array. For example, with respect to word groups having a word length of 2, when a bit of the bit array is set to 1, a corresponding word group is indicated as likely being present in at least one document of the group of documents. Occurrence information with respect to word groups of a word grouping collection assigned to a "medium density level" category may be stored in a partition function, partitioning groupings of words of the word grouping collection into word groups likely to be present in at least one document of a group of documents and word groups not present in any documents of the group of the documents. Occurrence information with respect to word groups of a word grouping collection assigned to a "low density level" category may be stored in a Bloom filter. In embodiments in which more than three density levels are used, Bloom filters may have different parameters for different density levels.

Bit arrays, partition functions, and Bloom filters are well known data structures. With respect to Bloom filters, an indication that a word group is not present in any documents of the group of documents indicates, with certainty, an absence of the word group in all documents of the group of documents. While an indication that a word group is present in at least one document of the group of documents indicates a likelihood that the word group is present in at least one document of the group of documents.

When a search query, including a group of distinct words is received, a list of all distinct groups of words of a predetermined word length, such as, for example, 2, may be produced. Each of the distinct groups of words may be converted to ranking groups. Corresponding word grouping collections and data structures may be accessed to determine whether any of the distinct groups of words are not present in any document of the group of documents, as indicated by the occurrence information. When any of the distinct groups of words are indicated as not being present in any one document of the group of documents, a search for documents containing all of the distinct groups of words may not be performed, thus, reducing an amount of processing resources consumed.

In some embodiments, when determining whether a group of words are likely to be included in at least one document of a group of documents, the group of words may be reducible to distinct groups of two words. For example, all possible two-word combinations from the group of words may be produced. For each of the two-word combinations, a two-word data structure, as described above, may be used to determine if any of the two-word combination occur in any documents. If at least one of the two-word combinations does not occur in at least one of the documents of the group of documents, as indicated by the two-word data structure, then the group of words would produce a zero search result.

Exemplary Operating Environment

Figure 1:
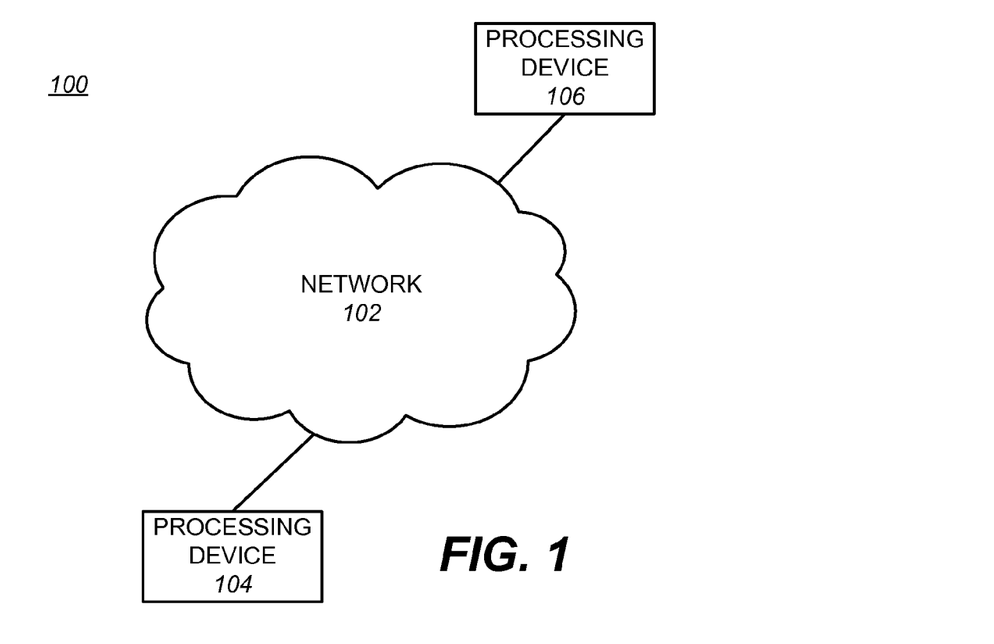
FIG. 1 illustrates an exemplary operating environment for embodiments consistent with the subject matter of this disclosure.

FIG. 1 illustrates exemplary operating environment 100 for embodiments consistent with the subject matter of this disclosure. Operating environment 100 may include a network 102, a processing device 104, and a processing device 106, which, in some embodiments, may be a server.

Processing device 104 may be a user's processing device, such as, for example, a desktop personal computer (PC), a laptop PC, a handheld processing device, or other processing device.

Network 102 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

Processing device 106 may be a server or a group of servers configured to work together. In embodiments in which processing device 106 includes a group of servers, the servers may be configured as a server farm.

Although FIG. 1 illustrates an environment having one processing device 104 and one processing device 106, various embodiments may include more or fewer of processing device 104 and processing device 106.

In some embodiments, processing device 104 may send a query, including a group of words, to processing device 106 via network 102 to request a search for an occurrence of the group of words in any one of a group of documents. A search result may be provided by processing device 106 to processing device 104 via network 102.

In other embodiments, processing device 104 may receive a query, including the group of words, from a user desiring to search for an occurrence of the group of words in any one of the group of documents. Processing device 104 may attempt to process the query and provide a search result to the user.

Exemplary Processing Device

Figure 2:
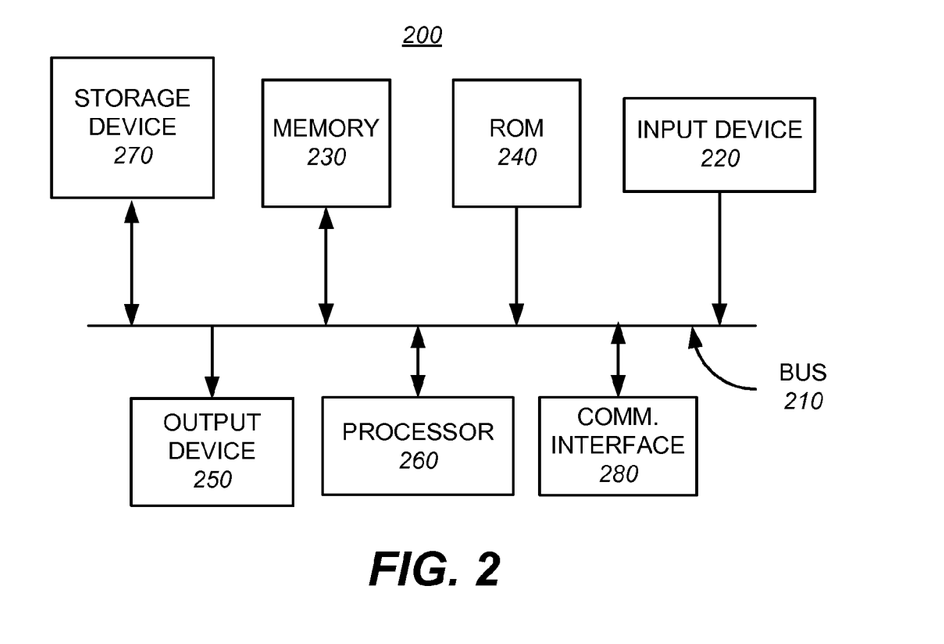
FIG. 2 illustrates an exemplary processing device which may implement embodiments consistent with the subject matter of this disclosure.

FIG. 2 is a functional block diagram of an exemplary processing device 200, which may be used in embodiments consistent with the subject matter of this disclosure to implement processing device 104 and/or processing device 106. Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include a compact disc (CD), digital video disc (DVD), a magnetic medium, or other type of storage device for storing data and/or instructions for processor 260. Communication interface 280 may include a wired or wireless interface for communicating to other devices via network 102.

Input device 220 may include a keyboard, a pointing device or other input device. Output device 250 may include one or more conventional mechanisms that output information, including one or more display screens, or other output devices.

Processing device 200 may perform such functions in response to processor 260 executing sequences of instructions contained in a tangible machine-readable medium, such as, for example, memory 230, ROM 240, storage device 270 or other medium. Such instructions may be read into memory 230 from another machine-readable medium or from a separate device via communication interface 280.

Exemplary Processing

Figure 3:
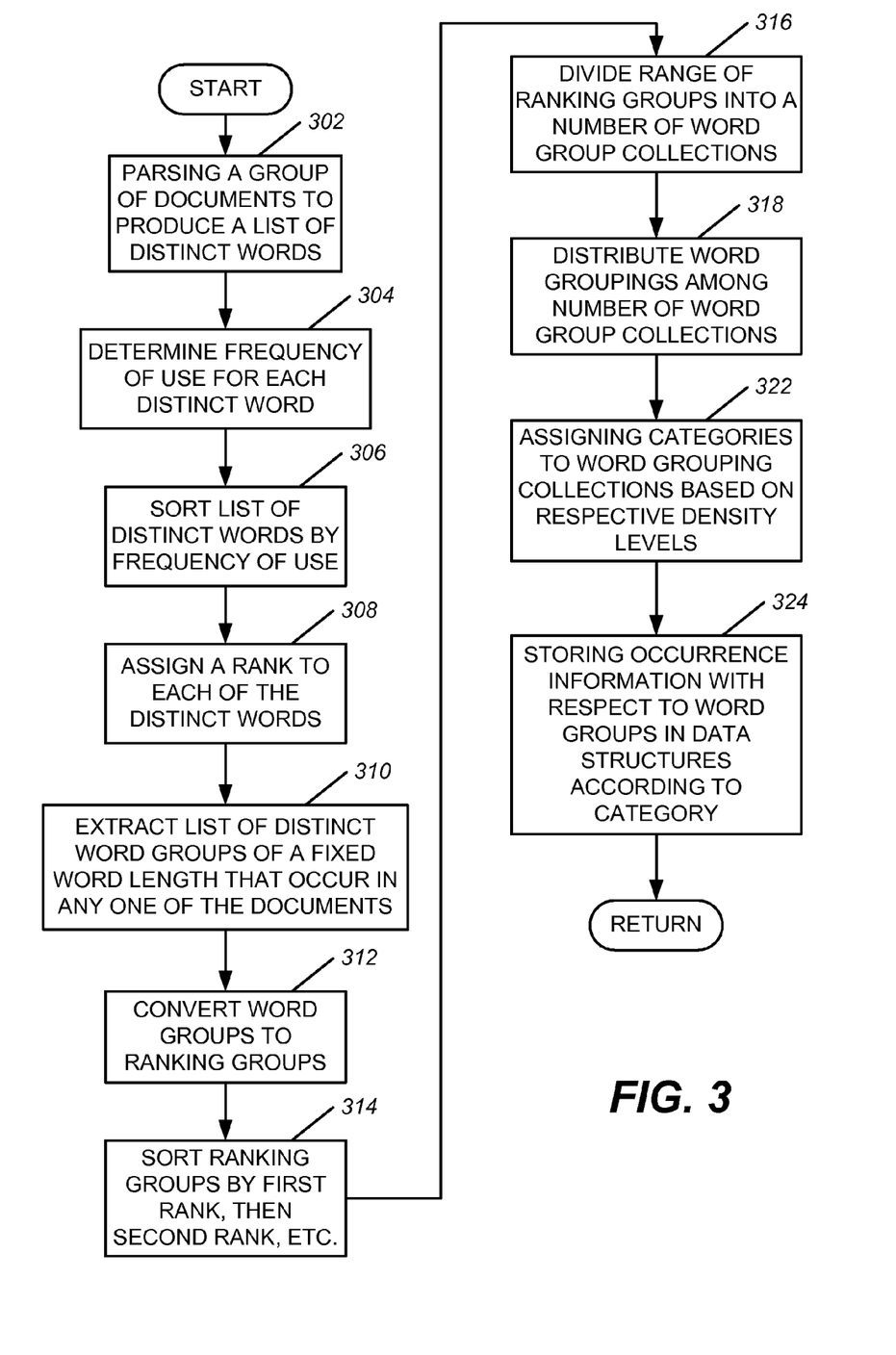
FIG. 3 is a flowchart of an exemplary process for creating data structures, including occurrence information, indicating a likelihood of a presence of all words of a word group in a document of a group of documents.

FIG. 3 is a flowchart of an exemplary process, which may be performed by a processing device such as, for example, processing device 104 or processing device 106, in embodiments consistent with the subject matter of this disclosure. The process may create data structures including occurrence information with respect to a likelihood of respective word groups being present in any of a group of documents. The process may begin with the processing device obtaining a list of distinct words by parsing the group of documents to produce the list of distinct words included in the group of documents (act 302). The processing device may determine a respective frequency of use, within the group of documents, for each of the distinct words included in the list (act 304). The processing device may then sort the list of distinct words in descending order by frequency of use (act 306). Thus, more frequently used words may appear in the list before other less frequently used words. The processing device may then assign a rank to each of the distinct words according to a respective position within the sorted list of distinct words (act 308). Thus, for example, a most frequently used distinct word may be assigned a rank of 1, a second most frequently used distinct word may be assigned a rank of 2, etc.

Next, the processing device may extract a list of distinct word groups of a fixed word length, which occur in any one of the group of documents (act 310). In some embodiments, the fixed word length may be a word length of two. In other embodiments, another fixed word length may be used.

The processing device may then convert the distinct word groups of the fixed word length to ranking groups (act 312). Thus, for example, a word group of fixed word length two, $\{w_1, w_2\}$, may be converted to a ranking group, $\{r_1, r_2\}$, where $r_1$ is an assigned rank corresponding to word $w_1$ and $r_2$ is an assigned rank corresponding to word $w_2$.

Next, the processing device may sort the ranking groups in ascending order, by a first rank corresponding to a first word of the word group, then a second rank corresponding to a second word of the word group (assuming that a word group has a fixed word length of two) (act 314).

The processing device may then divide a range of the ranking groups into a number of word grouping collections (act 316). For example, if the word groups, and thus the ranking groups, have a fixed length of two, then the range of the ranking groups may be divided into m×m word grouping collections, where m is an integer. The processing device may then distribute each of the word groups among the m×m word grouping collections (act 318). For example, each of the word groups may be distributed to, or associated with, a respective one of the word grouping collections associated with a corresponding ranking group.

Figure 4:
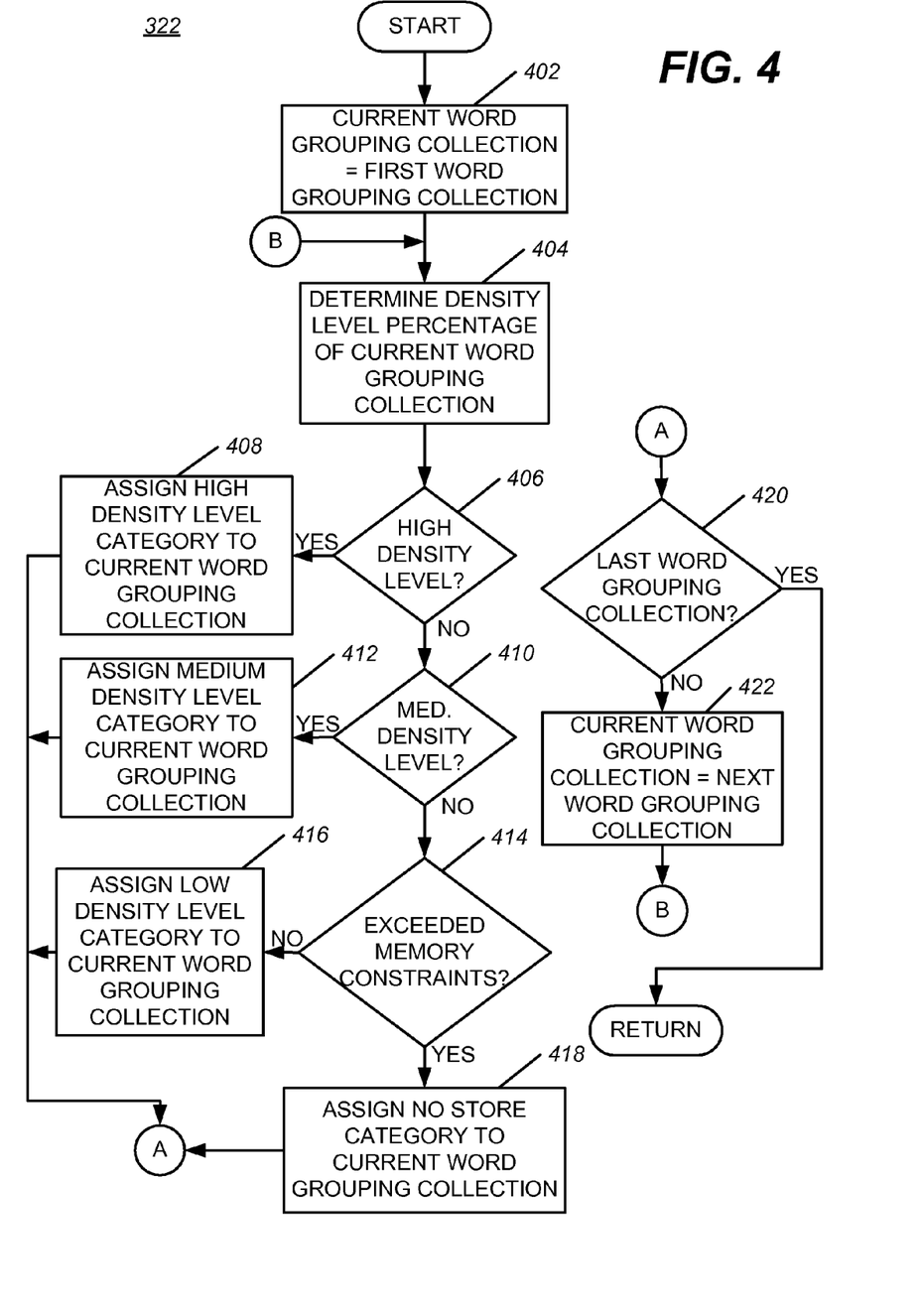
FIG. 4 is a flowchart illustrating a detailed process with respect to act 322 of FIG. 3.

Next, the processing device may assign categories to the word grouping collections based, at least in part, on respective density levels (act 322). FIG. 4 is a flowchart of an exemplary process for performing act 322. The process may begin with the processing device setting a current word grouping collection to a first word grouping collection (act 402).

A density level percentage of the current word grouping collection may then be determined (act 404). The processing device may determine the density level percentage of the current word grouping collection by calculating a percentage of possible word groups of the current word grouping collection that are present in any one document of the group of documents according to:

$$\text{Percentage} = \frac{NWG}{AWG} \quad \text{(Equ. 1)}$$

where NWG is a number of word groups of a fixed word length (for example, a fixed word length of 2) included in the current word grouping collection and present in any one document of the group of documents, and AWG is a number of all possible word groups of the fixed length distributed to the current word grouping collection.

Next, the processing device may determine whether the current word grouping collection has a high density level (act 406). The current word grouping collection may be determined to have the high density level if the density level percentage is greater than a first percentage, such as, for example, 10%, or another value. If the density level percentage is greater than the first percentage, then the processing device may assign a high density level category to the current word grouping collection (act 408).

If, during act 406, the processing device determines that the density level percentage of the current word grouping collection is not the high density level, then the processing device may determine whether the density level percentage of the current word grouping collection is a medium density level (act 410). The current word grouping collection may be determined to have the medium density level if the density level percentage is less than or equal to the first percentage, but greater than or equal to a second percentage, such as, for example, a 0.1%, or another value. If the density level percentage is less than or equal to the first percentage, but greater than or equal to the second percentage, then the processing device may assign a medium density level category to the current word grouping collection (act 412).

If the current word grouping collection is determined to have neither the high density level nor the medium density level, then the processing device may determine whether memory constraints, such as, for example, a predetermined amount of memory to be allocated for data structures of the word grouping collections, is exceeded (act 414). If the memory constraints are determined to be exceeded, then the processing device may assign a "no store" category to the current word grouping collection (act 418). Otherwise, the processing device may assign a low density level category to the current word grouping collection (act 416). Thus, if the memory constraints are not exceeded, the current word grouping collection may be assigned a low density level category when the density level percentage is less than the second percentage.

After performing acts 408, 412, 416 or 418, the processing device may determine whether the current word grouping collection is a last word grouping collection (act 420). If the current word grouping collection is determined to be the last word grouping collection, then the process may be completed. Otherwise, the current word grouping collection may be set to a next word grouping collection (act 422) and act 404 may again be performed to determine a density level percentage.

Returning to FIG. 3, the processing device may then store occurrence information, with respect to word groups of the fixed word length, in respective data structures of corresponding word grouping collections (act 324). Types of the respective data structures may be based on categories assigned to the corresponding word grouping collections. The process may then be completed.

Figure 5:
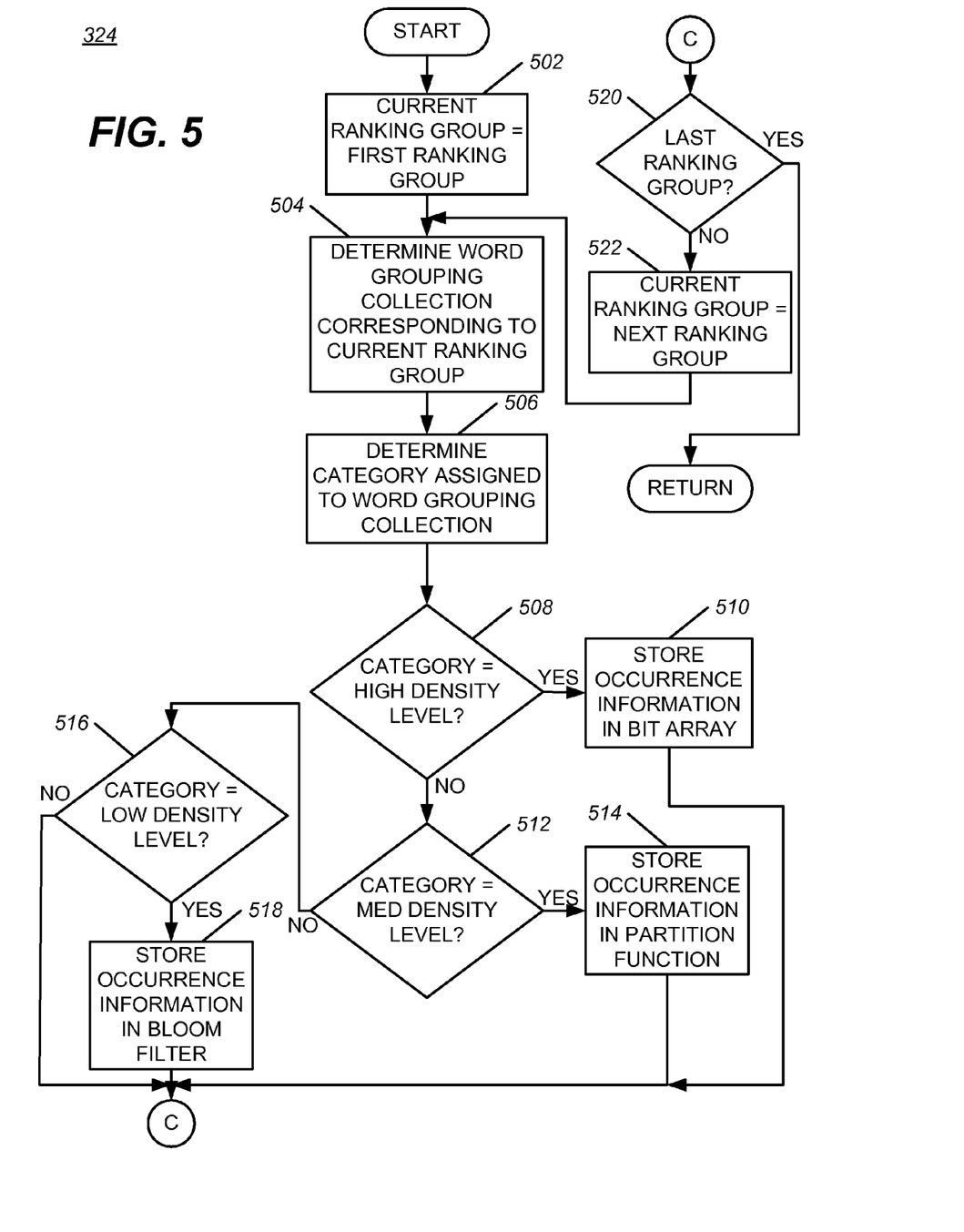
FIG. 5 is a flowchart illustrating a detailed process with respect to act 324 of FIG. 3.

FIG. 5 is a flowchart of an exemplary process for performing act 324 of FIG. 3. The process may begin with the processing device setting a current ranking group to a first ranking group of the sorted ranking groups produced during act 314 (FIG. 3) (act 502). The processing device may then determine a word grouping collection corresponding to the current ranking group (act 504) and a category assigned to the word grouping collection (act 506).

The processing device may then determine if the category is a high density level category (act 508). If the category is a high density level category, then the processing device may store occurrence information in a bit array data structure corresponding to the word grouping collection (act 510). The occurrence information may be stored in the bit array data structure by setting a bit, corresponding to the current ranking group, to 1 to indicate that at least one of the group of documents includes all words of the word group corresponding to the current ranking group. For example, if the current ranking group is {5, 87} then a bit in a fifth row, 87th column of the bit array may be set to 1. A 0 value in a position of the bit array data structure may indicate that a word group, corresponding to a ranking group associated with the position of the bit array, is not present in any one of the group of documents. Of course, in other embodiments, a meaning of a 1 bit and a 0 bit of the bit array data structure may be reversed.

If, during act 508, the processing device determines that the category of the word grouping collection is not a high density level category, then the processing device may determine whether the category is a medium density level category (act 512). If the category is a medium density level category, then the processing device may store occurrence information in a partition function data structure corresponding to the word grouping collection (act 514). The partition function may be used to distinguish a word group, corresponding to a ranking group, as being either a member of a set of word groups present in any one document of the group of documents, or a member of a set of word groups not present in any document of the group of documents. The occurrence information may be stored in the partition function, such that the partition function associates the word group, corresponding to the current ranking group, as belonging to the set of word groups present in any document of the group of documents.

If, during act 512, the processing device determines that the category of the word grouping collection is not a medium density level category, then the processing device may determine whether the category is a low density level category (act 516). If the category is a low density level category, then the processing device may store occurrence information in a Bloom filter data structure corresponding to the word grouping collection (act 518). The Bloom filter is a well-known data structure. In embodiments consistent with the subject matter of this disclosure, storing the occurrence information in the Bloom filter may indicate a likelihood that a word group corresponding to the current ranking group is present in at least one document of the group of documents. When the Bloom filter indicates that the word group corresponding to the current ranking group is not present in any of the group of documents, then the word group is guaranteed to not be present in any document of the group of documents.

If, during act 516, the processing device determines that the category is not the low density level category, then the category may be assumed to be a "not stored" category and no occurrence information may be stored in a data structure.

After performing any of acts 510, 514, 516, or 518, the processing device may determine whether the current ranking group is a last ranking group (act 520). If the current ranking group is the last ranking group, then the process may be completed. Otherwise, the processing device may set the current ranking group to a next ranking group (act 522) and processing may proceed with act 504.

Figure 6:
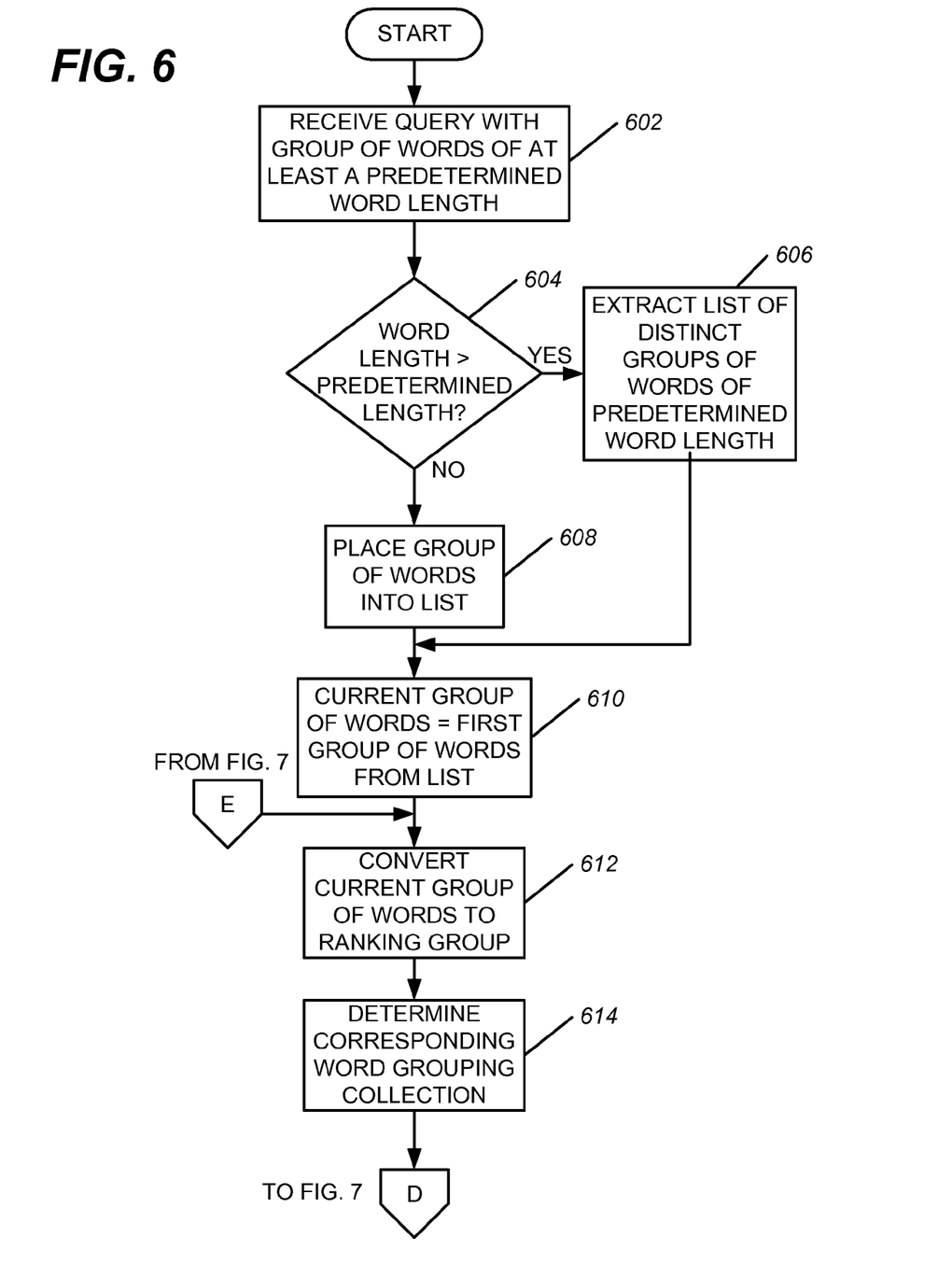
FIGS. 6 and 7 are flowcharts illustrating an exemplary process for determining whether a search would result in a zero search result before expending processing resources to search at least one index of a group of documents.
Figure 7:
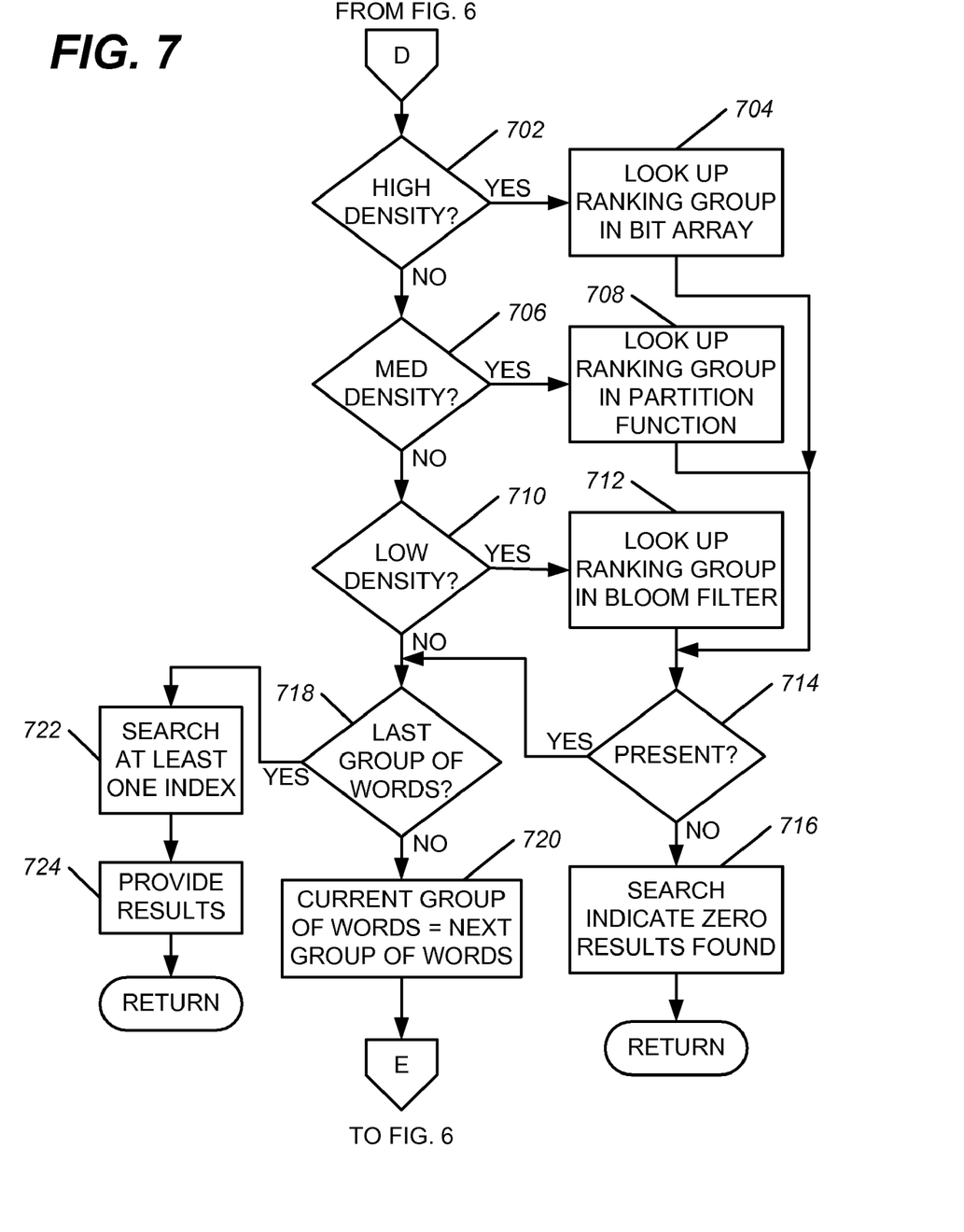

A processing device may receive a query, with respect to a group of documents, to search for ones of the group of documents including all words of a provided group of words. The processing device may be a server or a server farm receiving the query from a user's processing device via a network. Alternatively, the processing device may be a user's processing device configured to process the query. FIGS. 6 and 7 are flowcharts of an exemplary process for processing the query.

The process may begin with the processing device receiving the query including a group of words of at least a predetermined word length (act 602). In some embodiments, the predetermined word length may be 2. In other embodiments, the predetermined word length may be a larger value. The processing device may then determine whether the group of words has a word length greater than the predetermined word length (act 604). If the group of words has a word length greater than the predetermined word length, then the processing device may extract a list of distinct groups of words of the predetermined length from the received group of words (act 606). For example, if the received group of words is {diagram, concentric, adjacent} and the predetermined length is 2, then the processing device may extract a list of distinct groups of words, such as, {diagram, concentric}, {diagram, adjacent}, {concentric, adjacent}. If the word length of the received group of words is determined to be not greater than the predetermined length, then the received group of words may be placed into a list of distinct groups of words (which, in this case, includes one distinct group of words) (act 608).

The processing device may then set a current group of words to be a first group of words from the list of distinct groups of words (act 610). The current group of words may then be converted to a ranking group (act 612). For example, if the current group of words is {diagram, adjacent} having corresponding word rankings of {25, 12}, then {diagram, adjacent} may be converted to a ranking group, {25, 12}. The processing device may then determine a word grouping collection corresponding to the ranking group (act 614).

The processing device may then determine whether a category of the word grouping collection is a high density category (act 702; FIG. 7). If the category is the high density level category, then the processing device may look up occurrence information corresponding to the ranking group in a bit array associated with the word grouping collection (act 704).

If, during act 702, the processing device determines that the category is not the high density level category, then the processing device may determine whether the category of the word grouping collection is a medium density level category (act 706). If the category is the medium density level category, then the processing device may look up occurrence information corresponding to the ranking group in a partition function associated with the word grouping collection (act 708).

If, during act 706, the processing device determines that the category is not the medium density level category, then the processing device may determine whether the category of the word grouping collection is a low density level category (act 710). If the category is the low density level category, then the processing device may look up occurrence information corresponding to the ranking group in a Bloom filter associated with the word grouping collection (act 712).

If, during act 710, the processing device determines that the category is not the low density level category, then the processing device may assume that the category is a "not stored" category and the processing device may further assume that the current group of words is present in one of the group of documents.

After performing act 704, act 708, or act 712, the processing device may determine whether the group of words corresponding to the looked up ranking group is indicated as being present in one of the group of documents (714). If the group of words is indicated as being not present in all of the group of documents, then the processing device may indicate that a zero search result was found (act 716). Otherwise, the processing device may determine whether the group of words is a last group of words from the list of distinct groups of words (act 718). If the processing device determines that the group of words is not the last group of words from the list of distinct groups of words, then the processing device may set the current group of words to a next group of words (act 720). Processing may then proceed to act 612 (FIG. 6) to convert the current group of words to a ranking group.

If, during act 718, the processing device determines that the group of words is the last group of words from the list of distinct groups of words, then the processing device may search at least one index, with respect to words included in the group of documents, to search for any of the group of documents including the received group of words (act 722). The processing device may then provide a result of the search (act 724) and the process may be completed.

As one could see from the flowcharts of FIGS. 6 and 7, the exemplary process may indicate a zero search result if respective occurrence information of any of the distinct group of words of the predetermined word length, extracted from the received group of words, indicates that a corresponding distinct group of words of the predetermined word length is not present in any document of the group of documents. Thus, for example, if the list of distinct groups of words are {diagram, concentric}, {diagram, adjacent}, and {concentric, adjacent}, then if corresponding occurrence information indicates that any of {diagram, concentric}, {diagram, adjacent}, or {concentric, adjacent} are not present in any document of the group of documents, then the exemplary process may indicate a zero search result.

Miscellaneous

The above-mentioned embodiments assume that a query includes a group of words, such that a search for documents having all words of the group of words may be performed. In variations of the above-mentioned embodiments, instead of searching for documents having all words of the group of words, a search for documents having the group of words as consecutive words, or words within a window (such as a window of 20 words, or other number of words) may be performed. In an embodiment in which searches may be performed for a group of consecutive words included in documents, stored occurrence information may indicate a likelihood of the group of consecutive words being included in any of the documents. Similarly, in an embodiment in which searches may be performed for documents having a group of words within a window, stored occurrence information may indicate a likelihood of the group of words being included within the window in any of the documents.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. For example, instead of sorting the list of distinct words in descending order by frequency of use, as described with respect to act 306 of FIG. 3, the list of distinct words may be sorted in ascending order. In addition, instead of sorting ranking groups by a first rank, a second rank, etc., as described with respect to act 314 of FIG. 3, the ranking groups may be sorted by the second rank, then the first rank (for a ranking group of length 2). Further, implementations consistent with the subject matter of this disclosure may have more or fewer acts than as described, or may implement acts in a different order than as shown. Accordingly, only the appended claims and their legal equivalents define the invention, rather than any specific examples given.

We claim as our invention:

1. A machine-implemented method for creating at least one data structure for determining whether a query for at least one document of a plurality of documents including a group of words is likely to produce a non-zero search result, the machine-implemented method comprising:

obtaining a list of distinct words from the plurality of documents;

assigning a rank to each of the distinct words based on a frequency of use within the plurality of documents;

extracting a list of word groups from the list of distinct words, each of the word groups being present in any one of the plurality of documents;

distributing the word groups into a plurality of word grouping collections based on respective ranks assigned to each word of the word groups;

determining a density level percentage of each of the plurality of word grouping collections by calculating a percentage of possible word groups of the respective ones of the plurality of word grouping collections that are present in any one document of the plurality of documents according to:

$$\text{Percentage} = \frac{NWG}{AWG},$$

where NWG is a number of word groups of a fixed word length included in a respective one of the plurality of word grouping collections and present in any one document of the plurality of documents, and AWG is a number of all possible word groups of the fixed length distributed to the respective one of the plurality of word grouping collections;

assigning a density level category to each of the word grouping collections based on the corresponding density level percentage;

storing, with respect to at least some of the word grouping collections, occurrence information into a respective one of the at least one data structure, the occurrence information indicating a likelihood that ones of the word groupings are included in any one of the plurality of documents, a type of the respective one of the at least one data structure being based, at least in part, on the density level category assigned to the respective word grouping collection, after performing the storing, if specific occurrence information corresponding to a specific word grouping indicates that the specific word grouping is not included in any document of the plurality of documents, then the specific word grouping is not included, with certainty, in any document of the plurality of documents, such that a search of at least one index, with respect to the plurality of documents, in an attempt to find ones of the plurality of documents having all words of the specific word grouping is avoided after referencing the specific occurrence information, wherein the machine-implemented method is performed by a processing device.

2. The machine-implemented method of claim 1, wherein the type of the respective one of the at least one data structure for storing the occurrence information with respect to the respective word grouping collection is based, at least in part, on the category assigned to the respective word grouping collection.

3. The machine-implemented method of claim 1, wherein each of the word groups of the extracted list of word groups has a word length of two.

4. The machine-implemented method of claim 1, wherein:

the storing, with respect to at least some of the word grouping collections, of occurrence information into a respective one of the at least one data structure further comprises:

storing occurrence information, with respect to a word grouping collection having a first density level, into a bit array, each bit of the bit array corresponding to a particular word grouping of the word grouping collection, storing occurrence information with respect to a word grouping collection having a second density, into a partition function, the partition function indicating word groupings of the word grouping collection included in any one of the documents and other word groupings of the word grouping collection not included in any one of the plurality of documents, and storing occurrence information with respect to a word grouping collection having a third density level category into a Bloom filter.

5. The machine-implemented method of claim 1, wherein:

a plurality of categories available to be assigned to the plurality of word grouping collections comprise:

a first density level category in which at least a first percentage of word groupings of the respective word grouping collection are included in any one of the plurality of documents, a second density level category in which a percentage of the word groupings assigned to the respective word grouping collection and included in any one of the plurality of documents is greater than a second percentage and less than the first percentage, a third density level category in which less than the second percentage of the word groupings assigned to the respective word grouping collection are included in any one of the plurality of documents, and a not stored category assigned to some of the word grouping collections based on memory constraints or a query history, occurrence information with respect to word grouping collections assigned to the not stored category not being stored.

6. The machine-implemented method of claim 1, wherein:
the occurrence information indicates a likelihood that ones of the word groupings are included within a window of a given number of words in any one of the plurality of documents.

7. The machine-implemented method of claim 1, wherein:
the occurrence information indicates a likelihood that ones of the word groupings are included as consecutive words in any one of the plurality of documents.

8. A processing device comprising:
at least one processor; and
a memory connected to the at least one processor, the memory further comprising:
  instructions for receiving a group of words,
  instructions for converting the group of words to a ranking group, each ranking of the ranking group corresponding to a frequency of use of a respective word of the group of words within a plurality of documents,
  instructions for identifying a word grouping collection from among a plurality of word grouping collections and a corresponding category assigned to the identified word grouping collection, based on the ranking group,
  instructions for determining whether occurrence information corresponding to the group of words indicates either a likelihood of a presence of at least one document of the plurality of documents including all words of the group of words or a certainty that no document of the plurality of documents includes all of the words of the group of words, and
  instructions for searching at least one index with respect to the plurality of documents to attempt to find ones of the plurality of documents having all of the words of the group of words only when the instructions for determining fail to indicate the certainty that no document of the plurality of documents includes all of the words of the group of words, wherein:
    the instructions for identifying a word grouping collection from among a plurality of word grouping collections and a corresponding category assigned to the identified word grouping collection, based on the ranking group further comprise:
      instructions for determining a density level percentage of the word grouping collection by calculating a percentage of possible word groups of the word grouping collection that are present in any one document of the plurality of documents according to:

$$\text{Percentage} = \frac{NWG}{AWG},$$

where NWG is a number of word groups of a fixed word length included in the word grouping collection and present in any one document of the plurality of documents, and AWG is a number of all possible word groups of the fixed length distributed to the word grouping collection, and
      instructions for assigning a density level category to the word grouping collection based on the corresponding density level percentage.

9. The processing device of claim 8, wherein the instructions for determining whether occurrence information corresponding to the group of words indicates a likelihood of a presence of at least one document of the plurality of documents including all words of the group of words, further comprise:
  instructions for accessing a data structure corresponding to the identified word grouping collection, the data structure including the occurrence information indicating either the likelihood of the presence of at least one of the documents of the plurality of documents including two of the words of the group of words or a certainty that no document of the plurality of documents includes the two of the words of the group of words, a type of the data structure being based on the category corresponding to the identified word grouping collection, wherein:
    the word grouping collection is assigned a first density level category when at least a first percentage of groupings of two words included in the identified word grouping collection are included in any one of the plurality of documents,
    the word grouping collection is assigned a second density category when a percentage of the groupings of two words included in the identified word grouping collection and included in any one of the plurality of documents is greater than a second percentage and less than the first percentage, and
    the word grouping collection is assigned a third density category when less than the second percentage of the groupings of two words are included in any one of the plurality of documents.

10. The processing device of claim 8, wherein the instructions for determining whether occurrence information corresponding to the group of words indicates a likelihood of a presence of at least one document of the plurality of documents including all words of the group of words, further comprise:
  instructions for determining all distinct word pairs formed from the group of words,
  instructions for accessing a data structure corresponding to the identified word grouping collection, the data structure including occurrence information indicating a likelihood of a presence of at least one of the documents of the plurality of documents including one of the distinct word pairs, a type of the data structure being based on the category corresponding to the identified word grouping collection, and
  instructions for not executing the instructions for searching at least one index with respect to the plurality of documents to attempt to find ones of the plurality of documents having all of the words of the group of words when the occurrence information of the data structure indicates that the one of the distinct word pairs is not included in any of the documents of the plurality of documents.

11. The processing device of claim 8, wherein the instructions for determining whether occurrence information corresponding to the group of words indicates a likelihood of a presence of at least one document of the plurality of documents including all words of the group of words, further comprise:
  instructions for accessing a data structure corresponding to the identified word grouping collection, the data structure including occurrence information indicating either the likelihood of a presence of at least one of the documents of the plurality of documents including two of the words of the group of words or a certainty that no document of the plurality of documents includes the two of the words of the group of words, a type of the data structure being based on the category corresponding to the identified word grouping collection, wherein:
the word grouping collection is assigned a first density category when at least a first percentage of groupings of two words included in the identified word grouping collection are included in any one of the plurality of documents,
the word grouping collection is assigned a second density category when a percentage of the groupings of two words included in the identified word grouping collection and included in any one of the plurality of documents is greater than a second percentage and less than the first percentage,
the word grouping collection is assigned a third density category when less than the second percentage of the groupings of two words are included in any one of the plurality of documents, and
when the word grouping collection is assigned the first density level category, the data structure is a bit array,
when the word grouping collection is assigned the second density level category, the data structure is a partition function, and
when the word grouping collection is assigned the third density level category, the data structure is a Bloom filter.

12. The processing device of claim 8, wherein the instructions for determining whether occurrence information corresponding to the group of words indicates a likelihood of a presence of at least one document of the plurality of documents including all words of the group of words, further comprise:
instructions for accessing a data structure corresponding to the identified word grouping collection, the data structure including occurrence information indicating either a likelihood of the presence of at least one of the documents of the plurality of documents including the group of words within a predetermined window or a certainty that no document of the plurality of documents includes the group of words within the predetermined window, a type of the data structure being based on the category corresponding to the identified word grouping collection.

13. A machine-readable storage medium having instructions for at least one processor recorded therein, the instructions comprising:
instructions for parsing a plurality of documents to produce a list of distinct words;
instructions for determining a frequency of use, within the plurality of documents, of each of the distinct words;
instructions for sorting the list of distinct words according to respective frequencies of use;
instructions for assigning a rank to each distinct word of the list of distinct words according to a respective position within the sorted list of distinct words;
instructions for extracting a list of all distinct word groups of a predetermined length occurring in an any one of the plurality of documents, the predetermined length being at least two;
instructions for converting each of the distinct word groups to a respective rank grouping;
instructions for sorting the rank groupings;
instructions for dividing a range of the rank groupings into a plurality of word grouping collections;
instructions for distributing the list of all distinct word groups of the predetermined length among the plurality of word grouping collections based on the rank groupings;
instructions for determining a category of each of the word grouping collections based on density levels of each of the word grouping collections, the density level being indicative of a percentage of ones of the list of the distinct word groups included in at least one document of the plurality of documents, with respect to ones of the list of distinct word groups distributed to the respective word grouping collection, the determined category being based on determining a density level percentage of each of the plurality of word grouping collections by calculating a percentage of possible word groups of the respective ones of the plurality of word grouping collections that are present in any one document of the plurality of documents according to:

$$\text{Percentage} = \frac{NWG}{AWG},$$

where NWG is a number of word groups of a fixed word length included in a respective one of the plurality of word grouping collections and present in any one document of the plurality of documents, and AWG is a number of all possible word groups of the fixed length distributed to the respective one of the plurality of word grouping collections;
instructions for storing, into a data structure, occurrence information with respect to a word group of one of the word grouping collections, a type of data structure being based on the category of the one of the word grouping collections, the occurrence information indicating either a likelihood that at least one document of the plurality of documents include all words of the word group of the one of the word grouping collections, or a certainty that no document of the plurality of documents includes all of the words of the word group of the one of the word grouping collections; and
instructions for searching at least one index, with respect to the plurality of documents, for at least one document of the plurality of documents that includes all of the words of the word group of the one of the word grouping collections only when the occurrence information, with respect to the word group of the one of the word grouping collections, fails to indicate the certainty that no document of the plurality of documents includes all of the words of the word group of the one of the word grouping collections.

14. The machine-readable storage medium of claim 13, wherein the instructions for storing, into a data structure, occurrence information with respect to a word group of one of the word grouping collections further comprise:
instructions for storing the occurrence information into a bit array data structure when the density level of the word grouping collection is a first density level,
instructions for storing the occurrence information into a partition function data structure when the density level of the word grouping collection is a second density level, the second density level being less dense than the first density level and more dense than a third density level, and
instructions for storing the occurrence information into a Bloom filter data structure when the density level is the third density level, the third density level being less dense than the first density level and the second density level.

15. The machine-readable storage medium of claim 13, wherein the instructions further comprise:
- instructions for receiving a query including a group of words;
- instructions for converting the group of words to a ranking group based on respective ranks assigned to each of the distinct words of the list of distinct words;
- instructions for identifying one of the plurality of word grouping collections and the category of the one of the plurality of word grouping collections based on the ranking group;
- instructions for determining whether the occurrence information of the identified one of the plurality of word grouping collections indicates a likelihood of a presence of at least one document of the plurality of documents including all words of the group of words; and
- instructions for searching the at least one index, with respect to the plurality of documents, to attempt to find ones of the plurality of documents having all of the words of the group of words when the instructions for determining indicate the likelihood of the presence of at least one document of the plurality of documents including all of the words of the group of words.

16. The machine-readable storage medium of claim 13, wherein the instructions further comprise:
- instructions for receiving a query including a group of words;
- instructions for converting the group of words to a ranking group based on respective ranks assigned to each of the distinct words of the list of distinct words;
- instructions for identifying one of the plurality of word grouping collections and the category of the identified one of the plurality of word grouping collections based on the ranking group;
- instructions for accessing occurrence information stored in a data structure of the identified one of the plurality of word grouping collections to determine whether the occurrence information of the identified one of the plurality of word grouping collections indicates a likelihood of a presence of at least one document of the plurality of documents including all words of the group of words; and
- instructions for searching at least one index, with respect to the plurality of documents, to attempt to find ones of the plurality of documents having all of the words of the group of words when the instructions for accessing occurrence information stored in a data structure of the identified one of the plurality of word grouping collections indicates the likelihood of a presence of at least one document of the plurality of documents including all of the words of the group of words, wherein:
  - when the category of the identified one of the plurality of word grouping collections corresponds to a first density level, the type of the data structure is a bit array,
  - when the category of the identified one of the plurality of word grouping collections corresponds to a second density level, the type of the data structure is a partition function, and
  - when the category of the identified one of the plurality of word grouping collections corresponds to a third density level, the type of the structure is a Bloom filter.

17. The machine-readable storage medium of claim 13, wherein the instructions further comprise:
- instructions for receiving a query including a group of words;
- instructions for converting the group of words to a ranking group based on respective ranks assigned to each of the distinct words of the list of distinct words;
- instructions for identifying one of the plurality of word grouping collections and the category of the identified one of the plurality of word grouping collections based on the ranking group; and
- instructions for determining whether occurrence information of the identified one of the plurality of word grouping collections indicates a likelihood of a presence of at least one document of the plurality of documents including all words of the group of words, wherein: the instructions for determining whether occurrence information of the identified one of the plurality of word grouping collections indicates a likelihood of a presence of at least one document of the plurality of documents including all words of the group of words further comprise:
- instructions for determining all distinct word pairs formed from the group of words,
- instructions for accessing a data structure corresponding to the identified word grouping collection, the data structure including the occurrence information indicating a likelihood of the presence of at least one of the documents of the plurality of documents including one of the distinct word pairs, a type of the data structure being based on the category corresponding to the identified word grouping collection, and
- instructions for not executing instructions for searching at least one index with respect to the plurality of documents to attempt to find ones of the plurality of documents having all of the words of the group of words when the occurrence information of the data structure indicates that the one of the distinct word pairs is not included in any of the documents of the plurality of documents.

18. The machine-readable storage medium of claim 13, wherein the instructions further comprise:
- instructions for assigning, based on a query history, some of the word grouping collections to an unstored category indicating that occurrence information with respect to the some of the word grouping collections is not to be stored.

19. The machine-readable storage medium of claim 13, wherein the instructions further comprise:
- instructions for assigning, based on memory constraints, some of the word grouping collections to an unstored category indicating that occurrence information with respect to the some of the word grouping collections is not to be stored, the some of the word grouping collections assigned to the unstored category having a low density level.

* * * * *